Feb. 5, 1952 A. M. YOCOM ET AL 2,584,959
CORK CONTAINING COMPOSITE SHEET MATERIAL
Filed Sept. 14, 1948
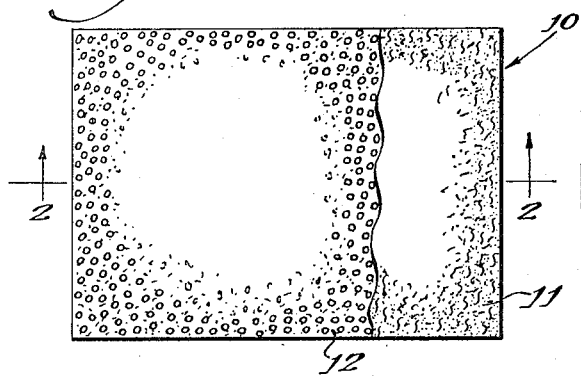
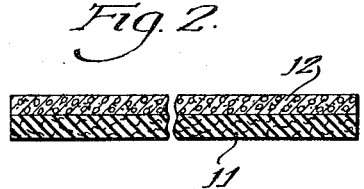
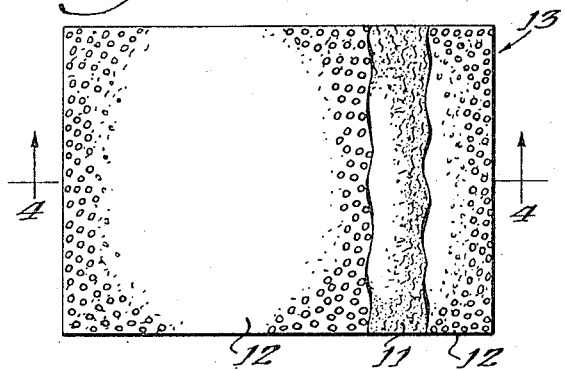
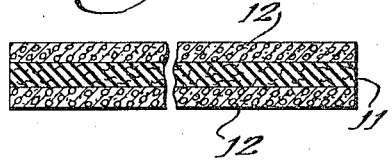
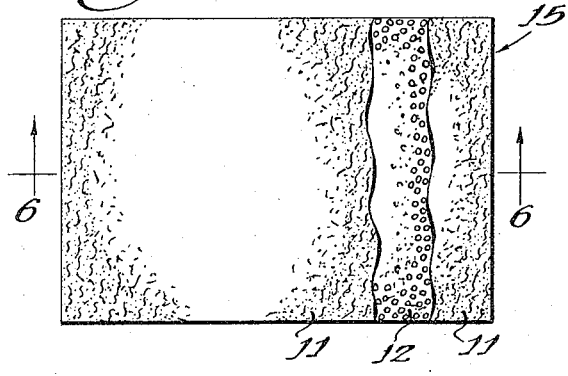
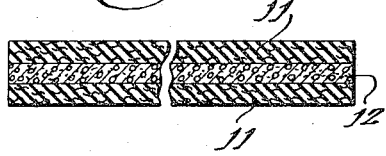
Inventors:
Alvin M. Yocom
George D'Olier
By: Lee J. Gary
Attorney Patented Feb. 5, 1952

2,584,959

UNITED STATES PATENT OFFICE 2,584,959

CORK CONTAINING COMPOSITE SHEET MATERIAL

Alvin M. Yocom, Detroit, Mich., and George D'Olier, Devon, Conn., assignors to Raybestos-Manhattan, Inc., Passaic, N. J., a corporation of New Jersey Application September 14, 1948, Serial No. 49,258

4 Claims. (Cl. 154—46)

1

This invention relates to the production of cork containing composite sheet material characterized by the properties of resiliency and compressibility plus strength.

More particularly the present invention relates to composite material composed of at least one thickness or stratum of an asbestos-rubber composition and at least one thickness or stratum of a cork-asbestos-rubber composition.

The novel subject matter of the present invention is particularly suitable for use as flange packing, gaskets, vibration dampening and the like sheet packing material uses. It is also useful for friction material such as oil clutches of the single or multiple disc type, automatic transmissions, supercharges and oil brakes.

The employment of asbestos-rubber compositions formed by the sheeter process, as is herein contemplated, is known. However, such conventional sheet packing material is often deficient in that it lacks adequate compressibility and resiliency with the result that imperfect sealing often results and in addition the binder content progressively sets up in use resulting in added seal failure. Sheet materials composed predominantly of cork and containing rubber and minor amounts of asbestos, produced by other known processes, has also been proposed for sealing materials, and although possessed of compressibility and resiliency, such cork sheeting lacks strength, heat and oil resistance and becomes readily sheared and ruptured in use.

In accordance with the present invention, we provide a composite construction composed of at least one layer of conventional asbestos-rubber compound, and at least one layer of the same general asbestos-rubber compound, but additionally containing from about 10% to about 30% by weight of ground cork, all formed and built up into sheets on a conventional apparatus known as a compressed asbestos sheeter, either in separate layers subsequently laminated, or preferably fabricated as one unit on the sheeter roll before removal.

The accompanying drawings diagrammatically illustrate several arrangements of the composite material formed in accordance with the present invention.

Fig. 1 is a surface view, with parts broken away, illustrating one form of our novel cork containing composite sheet material, and Fig. 2 is an enlarged section of the line 2—2 thereof.

Fig. 3 is a view similar to that of Fig. 1, but of modified construction, and Fig. 4 is an enlarged section on the line 4—4 thereof.

Fig. 5 is also a view similar to that of Fig. 1, but of another modified construction, and Fig. 6 is an enlarged section on the line 6—6 thereof.

Referring more specifically to the drawings, the reference numeral 10 generally indicates a two-strata composite sheet material in accordance with our invention, one stratum or layer 11 being of generally conventional asbestos-rubber-filler sheet packing composition, and the layer 12 being of similar composition but additionally containing ground cork.

Reference numeral 13 generally indicates a three-strata material having two outer cork containing layers 12 and an intermediate normal layer 11. Reference numeral 15 also generally indicates a three-strata material, but in this instance there are two normal outer layers 11 and an intermediate cork containing layer 12. It will be understood that in like manner we may also form composites having more than three layers.

In making the composite material of the present invention separate mixes of "sheeter consistency" are formed one being of fibrous asbestos, rubber material, solvent for the rubber material and conventional fillers, and the other being a similar composition but additionally containing from about 10% to about 30% of ground cork of from about 10 to about 40 mesh particle size. These mixes may be formed by the "dough process" which comprises the combining of rubber (natural or synthetic) with solvent to form a heavy dough following by mixing of this dough with asbestos and the other compounding materials, and for the cork containing mix, the cork particles are preferably added last and just prior to addition of a small amount of solvent requisite to bring the mix to desired sheeter consistency.

In the alternative mixing may be carried out in accordance with the process described and claimed in the co-pending application of George D'Olier, Serial No. 43,160 filed August 7, 1948, now U. S. Patent No. 2,534,814, wherein the rubber material is employed in latex form. By this latter process the fibrous asbestos is first mixed and wet with the rubber solvent, thereafter fillers are added, including cork particles for the cork containing mix, followed by addition of the latex. In the cork containing mixes, a portion of the cork may be introduced after adding the latex, and likewise a portion of the rubber solvent to bring the mix to desired sheeter consistency may be added at the end.

Sheeting of the mixes is preferably promptly carried out to prevent undue saturation of the cork, and this is done on a conventional asbestos sheeter which apparatus generally comprises two rolls constructed similarly to a rubber mill which has rolls of two different diameters and which run at even speeds. The larger roll, which is the build-up roll, is heated to a temperature of about 240° F.-270° F., and the smaller roll is run cold. The stock is fed to the nip of the rolls and builds up on the large hot roll, the speed of which may be from 4 to 7 R. P. M., picking up between .0005 and .001 inch of material per revolution. Pressure is applied by the cold roll which is continuously backed off during the build-up operation to the desired thickness of the sheet, which may for example be from 1/64 to 1/2 inch.

The composite sheet of the present invention may be made by separately forming sheets of the cork containing mix and the non-cork containing mix and subsequently laminating them. In the alternative composite material may be formed directly on the hot roll by for example, first feeding one mix until a desired thickness is built up and then feeding the other mix until a desired thickness thereof is built up, after which the composite is stripped from the roll.

The proportions of component materials will generally depend on the end use of the product. The rubber binder in the sheet material is generally permitted to progressively cure in use, although for some products cure is initially effected and the final compressibility of the cork containing material or layer may be determined by the amount of compression obtained during cure. Compressibility is also dependent on the amount of cork employed, although we employ cork in a minor amount, that is, less than 50%, and preferably between about 10% and about 30% by weight of the cork mix. This cork mix is to be further distinguished from conventional cork mixes in that we provide strong cork sheets by reason of employment of more asbestos than cork by weight, the asbestos comprising from 35% to 70% by weight of the cork containing mix, and rubber material comprising from about 10% to about 20% by weight of the mix.

As previously indicated, we employ ground cork preferably of graded particle size such as 10-20 mesh or 20-40 mesh. The asbestos may be from the paper making grade of fibres to the shorter spinning grades. The rubber material may be either natural rubber or various known synthetic rubbers, such as for example GR-S (butadiene-styrene copolymer), Buna N (butadiene-acrylonitrile copolymer), neoprene (2-chloro-1,3 butadiene) and the like butalastic polymers, all herein collectively designated as "rubber." The solvents employed are also the conventional rubber solvents such as gasoline, mineral spirits, petroleum naphtha, aromatic solvents such as toluene, or other known solvents such as methyl ethyl ketone, the latter being effectively employed alone or in combination with aromatics for Buna N. The latices may likewise be the normally occurring kinds or artificial dispersions, and they may have a solids content of from about 28% to about 60%. Other ingredients of these compositions are sulfur, accelerators, anti-oxidants, inert fillers, friction particles where desired, etc.

The following are examples of formulation, for the purpose of illustration, of the non-cork containing mix forming the layer or layers 11 of our described composites:

EXAMPLE 1

*Sheet packing formula*

| | Parts by weight |
|---|---|
| GR-S latex solids | 100 |
| Natural rubber | 36 |
| Curing ingredients and inert filler | 23 |
| Asbestos fiber | 750 |
| Petroleum naphtha solvent | 900 |

EXAMPLE 2

*Friction material formula*

| | Parts by weight |
|---|---|
| GR-S latex solids | 100 |
| Curing ingredients and inert fillers | 250 |
| Friction particles | 50 |
| Asbestos fiber | 270 |
| Petroleum naphtha solvent | 560 |

The following examples of formulation, for the purpose of illustration, of the cork containing mix for forming the layer or layers 12 of our described composites:

EXAMPLE 3

*Flange packing*

| | Parts by weight |
|---|---|
| Natural rubber latex solids | 100 |
| Curing ingredients and inert fillers | 110 |
| Ground cork 10-20 mesh | 73 |
| Asbestos | 410 |
| Petroleum naphtha solvent | 650 |

EXAMPLE 4

*Flange packing*

| | Parts by weight |
|---|---|
| GR-S rubber | 100 |
| Curing ingredients and inert fillers | 105 |
| Ground cork 20-40 mesh | 135 |
| Asbestos | 330 |
| Petroleum naphtha solvent | 690 |

EXAMPLE 5

*Friction material*

| | Parts by weight |
|---|---|
| GR-S latex solids | 100 |
| Curing ingredients and inert fillers | 80 |
| Ground cork 20-40 mesh | 170 |
| Asbestos | 220 |
| Petroleum naphtha solvent | 570 |

From the foregoing it will be apparent that we have provided a composite material characterized by at least one thickness of novel cork containing composition of good strength in itself and which is further reinforced by being formed with or bonded to an adjacent thickness of generally similar but relatively denser asbestos-rubber composition substantially devoid of cork particles, to provide a combination having the desirable properties of compressibility and resiliency plus strength and thus highly suited for the purposes hereinbefore described.

We claim as our invention:

1. Compressible, resilient, composite, reinforced cork-containing sheet material composed of a plurality of layers of fibrous asbestos-rubber composition, at least one of said layers including from about 10 to about 30 per cent by weight of cork particles of from about 10 to about 40 mesh size, from about 35 to about 70 per cent by weight of said fibrous asbestos and from about 10 to about 20 per cent of said rubber, and at least an adjacent one of said layers being substantially devoid of said cork particles and in reinforcing relationship to and of relatively greater density than the cork containing layer.

2. Compressible, resilient, composite, reinforced, cork-containing sheet material composed of a pair of bonded layers of fibrous asbestos-rubber composition, one of said layers including from about 10 to about 30% by weight of cork particles from about 10 to about 40 mesh size, from about 35 to about 70 per cent by weight of said fibrous asbestos and from about 10 to about 20 per cent by weight of said rubber, and the other of said layers being substantially devoid of said cork particles and in reinforcing relationship to and of relatively greater density than the cork-containing layer.

3. Compressible, resilient, composite, reinforced, cork-containing sheet material composed of a pair of layers of fibrous asbestos-rubber composition including from about 10 to about 30% by weight of cork particles from about 10 to about 40 mesh size, from about 35 to about 70 per cent by weight of said fibrous asbestos and from about 10 to about 20 per cent by weight of said rubber, and an intermediate fibrous asbestos-rubber composition layer bonded therebetween and substantially devoid of said cork particles and in reinforcing relationship to and of relatively greater density than the cork-containing layers.

4. Compressible, resilient, composite, reinforced, cork-containing sheet material composed of a layer of fibrous asbestos-rubber composition including from about 10 to about 30% by weight of cork particles from about 10 to about 40 mesh size, from about 35 to about 70 per cent by weight of said fibrous asbestos and from about 10 to about 20 per cent by weight of said rubber, bonded between a pair of fibrous asbestos-rubber composition layers substantially devoid of said cork particles and in reinforcing relationship to and of relatively greater density than the cork-containing layer.

ALVIN M. YOCOM.
GEORGE D'OLIER.

REFERENCES CITED

The following references are of record in the file of this patent:

UNITED STATES PATENTS

| Number | Name | Date |
|---|---|---|
| 269,517 | Fries | Dec. 26, 1882 |
| 1,567,506 | Hopkinson | Dec. 29, 1925 |
| 1,695,822 | Restein | Dec. 18, 1928 |
| 1,888,410 | Schacht | Nov. 22, 1932 |